United States Patent
Sill et al.

(10) Patent No.: US 9,370,016 B1
(45) Date of Patent: Jun. 14, 2016

(54) USE OF CONTROL INFORMATION TO MANAGE SELECTION OF SERVING COVERAGE SYSTEM

(71) Applicant: Sprint Spectrum L.P., Overland Park, KS (US)

(72) Inventors: Timothy W. Sill, Platte City, MO (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 213 days.

(21) Appl. No.: 14/160,145

(22) Filed: Jan. 21, 2014

(51) Int. Cl.
   *H04W 74/08* (2009.01)
   *H04W 72/08* (2009.01)
   *H04W 72/04* (2009.01)

(52) U.S. Cl.
   CPC .......... *H04W 72/085* (2013.01); *H04W 72/042* (2013.01)

(58) Field of Classification Search
   CPC ... H04L 5/0053; H04L 5/0057; H04L 5/0035; H04W 74/0833; H04W 74/002; H04W 84/045
   See application file for complete search history.

(56) References Cited

U.S. PATENT DOCUMENTS

| | | | |
|---|---|---|---|
| 8,160,034 B1 | 4/2012 | Sarkar et al. | |
| 2010/0216455 A1* | 8/2010 | Kazmi | H04J 11/0093 455/424 |
| 2010/0304748 A1* | 12/2010 | Henttonen | H04W 36/0077 455/436 |
| 2011/0002275 A1* | 1/2011 | Shousterman | H04W 16/06 370/329 |
| 2013/0100802 A1 | 4/2013 | Navratil et al. | |
| 2013/0183959 A1* | 7/2013 | Mihaly | H04W 60/00 455/422.1 |
| 2014/0293957 A1* | 10/2014 | Chun | H04L 5/0041 370/330 |
| 2015/0088659 A1* | 3/2015 | Lee | G06Q 30/02 705/14.64 |
| 2015/0181406 A1* | 6/2015 | Seo | H04W 48/12 370/329 |
| 2015/0189532 A1* | 7/2015 | Dimou | H04W 28/021 455/418 |

* cited by examiner

*Primary Examiner* — Fan Ng

(57) ABSTRACT

A UE gauges how many UEs are currently served in each of various coverage systems, by evaluating downlink control channel signaling in each coverage system to determine from the control signaling an extent to which the signaling provides for UE scheduling and to establish a corresponding relative measure of an extent to which the coverage system is serving UEs. In an example implementation, this evaluation may involve eliminating from consideration any control channel signaling that is not associated with UE scheduling, so as to determine by exclusion an extent to which the downlink control channel signaling is associated with UE scheduling. The UE then compares such relative measures of the various coverage systems as a basis to select a coverage system in which to operate, such as by favoring operation in the coverage that thereby seems to be serving the fewest number of UEs.

20 Claims, 5 Drawing Sheets

USE OF CONTROL INFORMATION TO MANAGE SELECTION OF SERVING COVERAGE SYSTEM

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or range of carrier frequencies, defining a frequency channel. In a frequency division duplex (FDD) arrangement, different carrier frequencies or ranges are used for the downlink than the uplink. Whereas, in a time division duplex (TDD) arrangement, the same carrier frequency or range is used for the downlink and uplink and is allocated over time among downlink and uplink communications. For purposes of this disclosure, a coverage area provided by a particular base station on a particular frequency channel may be considered to be a "coverage system." Thus, the a wireless network that provides service on various different frequency channels and/or that includes a number of different coverage areas provided by one or more base stations may be considered to define a number of distinct coverage systems.

Further, on each frequency channel, each coverage area may also define a number of subsidiary air interface channels for carrying information between the base station and the UEs. These channels may be defined in various ways, such as through frequency division multiplexing, time division multiplexing, and/or code-division multiplexing, for instance. By way of example, each coverage area may define a downlink control channel that may carry certain information such a control channel formatting information, a downlink reference signal that UEs may detect as an indication of coverage, system information, paging information, and the like, or may define various downlink control channels for carrying subsets of this information. And each coverage area may define an uplink control channel that may carry certain information such UE access requests, uplink reference signals, and the like, or may define various uplink control channels for carrying subsets of this information. Further, each coverage area may define one or more uplink and downlink shared channels, such as traffic channels or other resources, which the base station may allocate for use on an as-needed basis to carry communications between the base station and served UEs.

In general, a UE may operate in a particular coverage system provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

Overview

In normal practice, when a UE is within coverage of multiple coverage systems (e.g., multiple different frequency channels and/or multiple different physical coverage areas provided by one or more base stations), the UE may be configured to select one of the coverage systems in which to operate by determining which coverage system provides the strongest reference signal. A problem with this normal procedure, however, is that it does not take into consideration how many UEs are currently served by each coverage system and thus how available each coverage system may be to serve the UE. For example, if a base station is arranged to schedule transmissions to served UEs on a round-robin basis, then a UE might have a longer wait for service in a coverage system that is currently serving many UEs than in a coverage system that is currently serving few if any UEs. It would thus be advantageous for a UE to be able to compare various coverage systems based on how many UEs each coverage system is currently serving, and particularly how many connected UEs the coverage system is currently serving, and based on the comparison (and perhaps further on other factors, such as reference signal strength) to select one such coverage in which to operate.

At issue, however, is how a UE can gauge the number of UEs currently served by each coverage system that the UE detects.

One way to facilitate this is to configure the network so that base stations providing coverage systems broadcast in each coverage system expressly broadcast an indication of how many UEs are currently served by the coverage system. For instance, each base station may be configured to broadcast in each of its coverage systems a specific count of how many UEs the base station is currently serving in the coverage system. Or each base station may be configured to broadcast in each of its coverage systems an associated level value such as a value meaning "many UEs" or "few UEs". Each UE may then be configured to read that broadcast indication in each detected coverage system and to thereby determine how many UEs the coverage system is currently serving. To implement this solution, however, it would be necessary for base stations to regularly monitor how many UEs they are serving and to regularly update the broadcast indication accordingly.

Disclosed herein is an alternative method for a UE to gauge how many UEs are currently served in each of various coverage systems, so that the UE may then use that information as a basis to select a coverage system in which to operate. In accordance with the disclosure, a UE may evaluate downlink control channel signaling in each coverage system to determine from the control signaling an extent to which the signaling provides for UE scheduling (scheduling of uplink or downlink transmissions for the UE), and the UE may use that extent as an indication of how many UEs the coverage system is currently serving.

Further, the disclosure advantageously provides a way for the UE to do this even if some of the downlink control channel signaling is associated with UE scheduling but is masked in such a way that the UE would not refer to the signaling, such as if the signaling is masked in a manner specific to another UE. In particular, the UE may advantageously do this analysis by identifying and eliminating from consideration control channel signaling that is not associated with UE scheduling, so as to determine by exclusion an extent to which the downlink control channel signaling is associated with UE scheduling. The UE may then compute difference between (i) the determined extent to which the downlink control channel signaling is not associated with UE scheduling and (ii) a total size of downlink control channel signaling. And the UE may use that computed difference as a basis to establish a relative measure of how many UEs the coverage system is currently serving. (For instance, the UE may deem that difference to be the relative measure, or the UE may compute an associated percentage or other normalized measure.) The UE may then compare such relative measures of the various coverage systems as a basis to select a coverage system in which to operate, such as by favoring operation in the coverage system that seems to thereby be serving the fewest number of UEs.

Note that the measure the UE establishes for each coverage system in this process may be considered relative, in that the measure may not itself be a specific count of UEs served by the coverage system but may be a relative indication by way of comparison with a similar measure for each of one or more other coverage systems. In this regard, the control channel in each coverage system may carry some data that has typically the same size per coverage system, such as control channel formatting data, reference signal data, and the like. The portion of the control channel that carries that data may factor out in this comparison between coverage systems, particularly if this analysis is done on a percentage basis per coverage system. Further, note that the measure established by the UE in this process may be a rough estimate that is sufficient to provide a reasonable basis for comparison between the coverage systems, even if the measure is not exact or is not absolutely correct.

Accordingly, disclosed is a method operable by a UE in a wireless communication network that defines a plurality of coverage systems. In accordance with the method, the UE establishes respectively for each of the coverage systems a relative measure of how many UEs are served by the coverage system, with the measure being based on an evaluation of the extent to which a downlink control transmission in the coverage system does not carry signaling associated with UE scheduling. The UE then selects one of the coverage systems based at least on a comparison of the established relative measures of the coverage systems. And the UE then operates in the selected coverage system, such as by transmitting a request to the network to attach in and/or handover to that coverage system and then operating in the connected or idle mode in that coverage system.

In one example implementation of this method, for each coverage system, (a) the UE receives from the coverage system, such as from a base station providing the coverage, a downlink control channel transmission, such as a subframe of downlink control channel transmission, having a total number of resource elements, (b) the UE evaluates the resource elements of the received downlink control channel transmission to identify resource elements that are not associated with UE scheduling and to determine a quantity of the identified resource elements that are not associated with UE scheduling, and (c) the UE establishes the relative measure based at least on a difference between the total number and the determined quantity.

In another example implementation, for each coverage system, (a) the UE receives from the coverage system a downlink control channel transmission having a total number of resource elements, (b) the UE evaluates the resource elements of the received downlink control channel transmission to identify resource elements that are not associated with UE scheduling and, by exclusion, to thereby determine a quantity of resource elements that are associated with UE scheduling, and (c) the UE establishes the relative measure based on the determined quantity of resource elements that are associated with UE scheduling.

And in still another example implementation, for each coverage system, (a) the UE receives from the coverage system a physical downlink control channel (PDCCH) transmission, wherein the PDCCH transmission defines a total number of orthogonal frequency division multiplex (OFDM) resource elements, (b) the UE evaluates sets of the resource elements to determine for each set whether the set is empty and, if not empty, whether the set is masked with a radio network temporary identifier (RNTI) that is not associated with UE scheduling, and thereby determines a quantity of the resource elements that are each either empty or masked with an RNTI that is not associated with UE scheduling, and (c) the UE establishes the relative measure based at least in part on a difference between the total number of resource elements and the determined quantity.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will now be described by way of example in the context of LTE communication. It should be understood, however, that principles of the disclosure can extend to various other air interface protocols as well, with variations where appropriate. Further, even within the context of LTE communication, numerous variations from the specific arrangements and processes described herein are possible. For instance, various described machines, connections, functions, and other elements may be added, omitted, distributed, re-located, combined, or changed in other ways.

Figure 1:
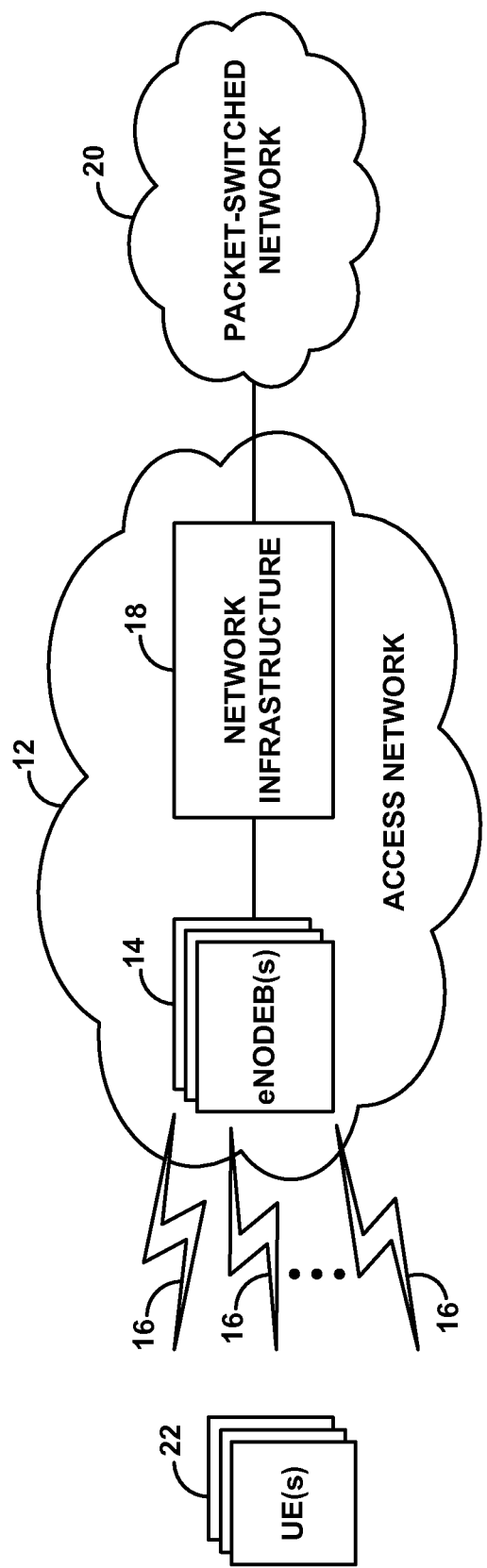
FIG. 1 is a simplified block diagram of a network arrangement in which various embodiments of the present disclosure can be implemented.

The arrangement of FIG. 1 includes by way of example a representative LTE access network 12 including one or more example LTE base stations known as eNodeBs 14, which radiate to provide one or more wireless coverage systems 16 in which UEs may operate. Each of the one or more eNodeBs is then coupled with core LTE network infrastructure 18, which may include a mobility management entity (MME), a serving gateway (SGW) and a packet-data network gateway (PGW) providing connectivity with a packet-switched network 20 such as the Internet. Shown within coverage of the LTE access network are then one or more representative UEs 22. In practice, the LTE access network may be operated by a cellular wireless service provider, and each UE may subscribe to service of that provider.

In accordance with a recent version of LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus supporting transmission of 12 orthogonal frequency division multiplex (OFDM) symbols in respective "resource elements." Thus, the eNodeB and a served UE may transmit symbols to each other in these resource elements, particularly on subcarriers that are spaced apart from each other by 15 kHz and in time segments spanning 67 μs each. (Note that the term "resource element" may have other meanings under other air interface protocols. For instance, it may not have both time and frequency dimensions.)

The LTE air interface may then define various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the eNodeB can allocate to carry transmissions to particular UEs on an as-needed basis. Likewise, on the uplink, certain resource elements across the bandwidth may be reserved to define a physical uplink control channel (PUCCH), and other resource elements may be reserved to define a physical uplink shared channel (PUSCH) that the eNodeB can allocate to carry transmissions from particular UEs on an as-needed basis.

In practice, the PDCCH in each coverage system (provided by a particular eNodeB on a particular frequency channel) may span the first one, two, or three symbol rows (67 μs segments) of each subframe in the time domain and may span the full channel bandwidth in the frequency domain. Certain resource elements in the PDCCH (e.g., in each subframe) may then be reserved for special use, as indicated by system overhead messaging or by default network configuration for instance. For example, certain resource elements distributed throughout the PDCCH (and throughout the PDSCH for that matter) may be reserved to define a downlink reference signal for the coverage system. Further, other resource elements in the PDCCH may be reserved to define a physical control format indicator channel (PCFICH), other resource elements in the PDCCH may be reserved to define a physical Hybrid ARQ indicator channel (PHICH), and still other resource elements in the PDCCH may be reserved as unused. The remaining resource elements of the PDCCH may then be considered to define mutually exclusive resource element groups (REGs) of four resource elements each, and the eNodeB may use sets of those REGs to communicate control signaling to UEs, with the sets possibly differing from each other in size based on various operational considerations.

In accordance with LTE, the eNodeB may use various RNTIs to provide certain types of control signaling on the PDCCH. In particular, when the eNodeB has control signaling to provide in the form of a bit string that would represent certain information for receipt by one or more UEs, the eNodeB may apply well known processing to compute a CRC from that bit string, and the eNodeB may then apply well known processing to mask (scramble) that CRC with an RNTI selected based on the type of information at issue. The eNodeB may then transmit on the PDCCH in a set of resource elements a number symbols that cooperatively represent the masked CRC along with the underlying bit string.

In turn, a UE may read the PDCCH in the coverage system and, on a per-subframe basis, engage in a well-known "blind decoding" process by which the UE evaluates each set of resource elements on the PDCCH in an effort to determine whether any of various particular RNTIs may work to demask the CRC in a manner that uncovers the correct CRC for the underlying bit string. If the UE thereby determines that a particular RNTI works, then the UE may read and perhaps make use of the underlying data associated in type with the applied RNTI. In many cases, the underlying data on the PDCCH may itself direct the UE to another portion of the air interface, such as to particular resource blocks on the PDSCH in the same subframe, to obtain more specific information from the eNodeB. And in other cases, the underlying data on the PDCCH may itself be the information that the eNodeB was conveying.

By way of example, the eNodeB may apply an "SI-RNTI" to a system information indicator on the PDCCH. Such a system information indicator may be a small amount of data that, when present, functions to inform UEs that system information, such as various system information blocks (SIBs) are present at a particular portion of the PDSCH. The SI-RNTI may be a fixed value that is applied universally by UEs operating in the network. That way, when any UE successfully applies the SI-RNTI to demask the correct CRC for the system information indicator, the UE may then proceed to read the indicated portion of the PDSCH to obtain the system information. As such, the SI-RNTI and the signaling to which it is applied is not associated with UE scheduling, because the SI-RNTI is not applied to signaling that provides or directs a recipient UE to information scheduling air interface transmission between the UE and the base station.

As another example, the eNodeB may apply a "P-RNTI" to a paging indicator on the PDCCH (i.e., to the CRC of the paging indicator). Such a paging indicator may be a small amount of data that, when present, functions to inform any and all UEs that are set to check for page messages in that subframe that at least one such page message exists, and perhaps to point to a portion of the PDSCH that carries any such page messages. The P-RNTI may also be a fixed value that is applied universally by UEs operating in the network. That way, when any UE that is set to check for page messages in that subframe successfully applies the P-RNTI to demask the correct CRC for the paging indicator, the UE may then proceed to read an associated portion of the PDSCH to search for any page messages destined to it specifically. As such, the P-RNTI and the signaling to which it is applied is also not associated with UE scheduling, because the P-RNTI is not applied to signaling that provides or directs a recipient UE to information scheduling air interface transmission between the UE and the base station.

As still another example, the eNodeB may apply an "RA-RNTI" to respond to a random access preamble transmission from a UE. In particular, when a UE transmits a random access preamble to the eNodeB using a particular uplink transmission resource, the eNodeB may signal its receipt of that random access preamble by providing this response in a corresponding downlink transmission resource. Thus, when a UE transmits a random access preamble to the eNodeB and successfully applies the RA-RNAI to demask the correct CRC for the random access response, the UE may conclude that the eNodeB received the random access preamble from the UE. As such, the RA-RNTI and the signaling to which it is applied is also not associated with UE scheduling, because the RA-RNTI is not applied to signaling that provides or directs a recipient UE to information scheduling air interface transmission between the UE and the base station.

On the other hand, as yet another example, the eNodeB may apply a "C-RNTI" to control information that schedules air interface transmission between a particular UE and the base station, such as to control information that specifies particular PDSCH or PUSCH resource blocks in which such transmission is to occur to or from that particular UE. As such, when a UE is in a connected mode, the eNodeB may assign a particular C-RNTI to the UE, so that the UE may work to find signaling on the PDCCH that is masked with that C-RNTI and to thereby determine where on the PDSCH or PUSCH the transmission between the UE and the base station will occur. Examples of the transmission that would be scheduled through this process include bearer data transmission (e.g., application layer communication) and buffer status report transmission, among others. Thus, the C-RNTI and the signaling to which it is applied is associated with UE scheduling, because the C-RNTI is applied to signaling that provides or directs a recipient UE to information scheduling air interface transmission between the UE and the base station.

Applying the present method in this context, a UE may conveniently receive and read the PDCCH of each of various coverage systems detected by the UE, and the UE may generate the relative measure per coverage system with respect to the PDCCH that the UE received and read from each coverage system. The UE may perform this analysis on a particular time segment of each coverage system, such as a particular frame or sub-frame of each coverage system, even if not the same time segment of each, as the analysis serves to provide a rough estimate of how many UEs are being served per coverage system. Thus, for one coverage system at a time, the UE may receive one subframe of PDCCH transmission and may evaluate that subframe of PDCCH transmission to establish the relative measure for that coverage system. And the UE may then compare the relative measures so as to use the comparison as a basis to select a coverage system in which to operate.

In particular, for a given coverage system, the UE may evaluate the received PDCCH transmission (e.g., subframe) to establish a count of resource elements that are not associated with UE scheduling, and the UE may deem a difference between that count and a total number of resource elements of the PDCCH transmission to be a basis for, or itself to be, the relative measure. In this process, the UE may or may not implicitly disregard certain portions of the received PDCCH transmission that could factor out in the comparison in any event, such as portions defining the PCFICH, the PHICH, and the reference signal as discussed above. Alternatively or additionally, the UE may establish through this process a count of resource elements that are associated with UE scheduling, as being resource elements that the UE did not determine to not be associated with UE scheduling.

In particular, the UE may evaluate mutually exclusive sets of resource elements at a time, such as REGs or sets of REGs. For each such set, the UE may first determine if the set of resource elements is empty, by determining if the set of resource elements contains no more than a predefined threshold level of energy, such as zero energy, or energy at a noise floor for instance. If the UE thereby determines that the set of resource elements is empty, then the UE may deem the set to not be associated with UE scheduling, and the UE may therefore accordingly increase the count of resource elements that are not associated with UE scheduling On the other hand, if the UE determines that the set of resource elements is not empty, then the UE may perform blind decoding on the set, attempting to apply each of various masks that are not associated with UE scheduling, such as the SI-RNTI, P-RNTI, and RA-RNTI masks discussed above. If the UE thereby determines that one of those masks works to successfully demask the CRC of the set, then the UE may deem the set to not be associated with UE scheduling in line with the discussion above, and the UE may accordingly increase the count of resource elements not associated with UE scheduling. On the other hand, if the UE thereby determines that none of those masks works to successfully demask the CRC of the set, then the UE may reasonably conclude, by exclusion, that the set is associated with UE scheduling, as the CRC of the set may be masked with a C-RNTI that the eNodeB had assigned to a recipient UE, and the UE may accordingly increase the count of resource elements associated with UE scheduling.

In practice, the received PDCCH transmission (e.g., subframe) of the coverage system being evaluated would have a total number of resource elements (which may be a total that does not include certain resource elements discussed above such those that define a PCFICH, a PHICH, and a reference signal). Given the UE's count of resource elements that are not associated with UE scheduling, the UE may compute a difference between that count and the total and use that difference as the relative measure for the coverage system. Or the UE may compute a more normalized relative measure, such as a percentage that the count is of the total, to provide a possibly better basis for comparison between coverage systems. Alternatively or additionally, the UE may use the count of resource elements that are associated with UE scheduling, or a similarly normalized version of such a count, as the relative measure. In either case, as discussed above, the relative measure may thereby function as a rough estimate of how many UEs are being served (e.g., in a connected mode and being scheduled) by the coverage system.

The UE may then conveniently compare these relative measures between coverage systems, and select the system thereby determined to be serving the fewest UEs, or at least factor that into the decision of which coverage system to select (perhaps considering other factors such as reference signal strength for instance).

Figure 2:
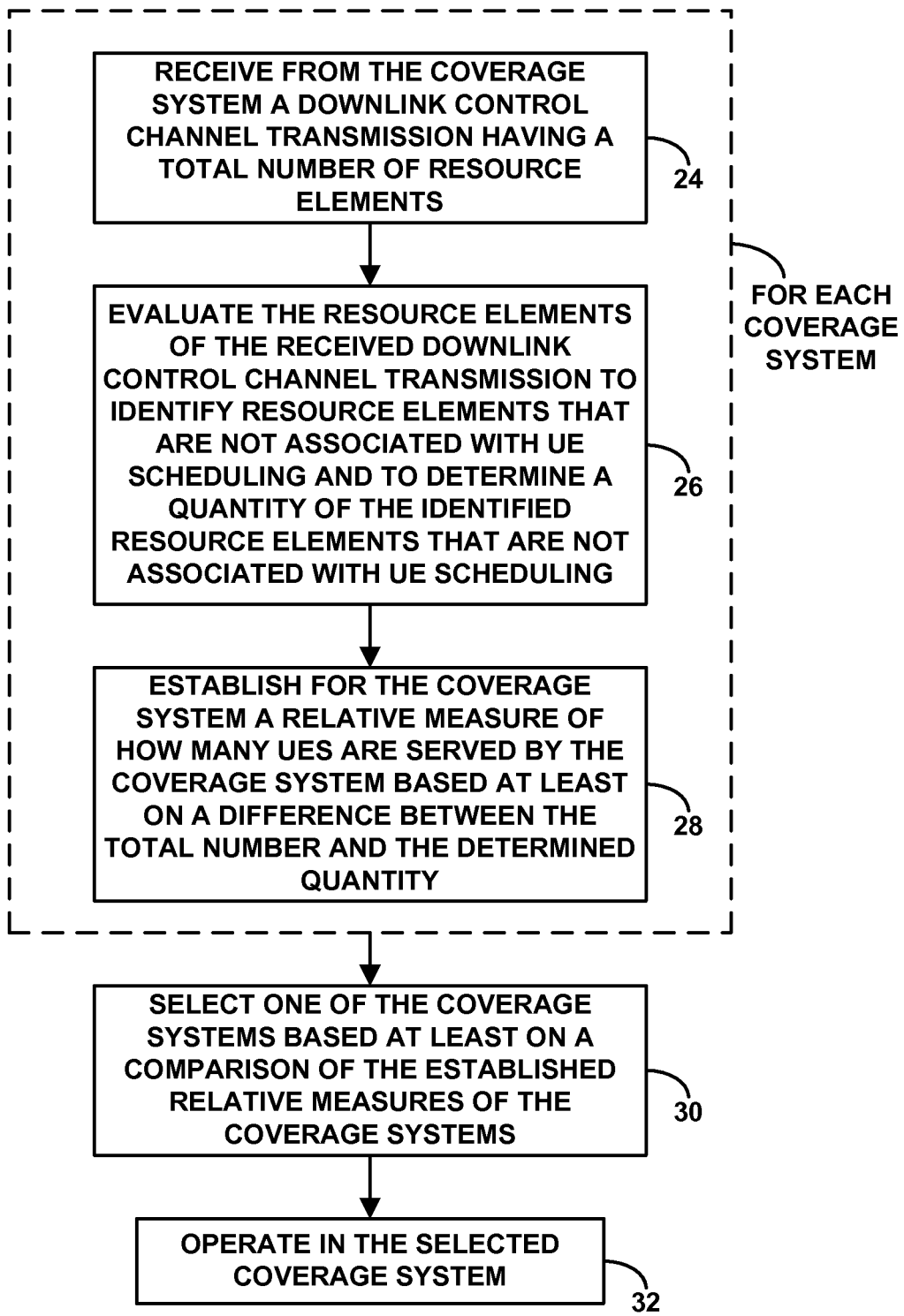
FIG. 2 is a flow chart depicting functions that can be carried out in accordance with an example implementation.
Figure 3:
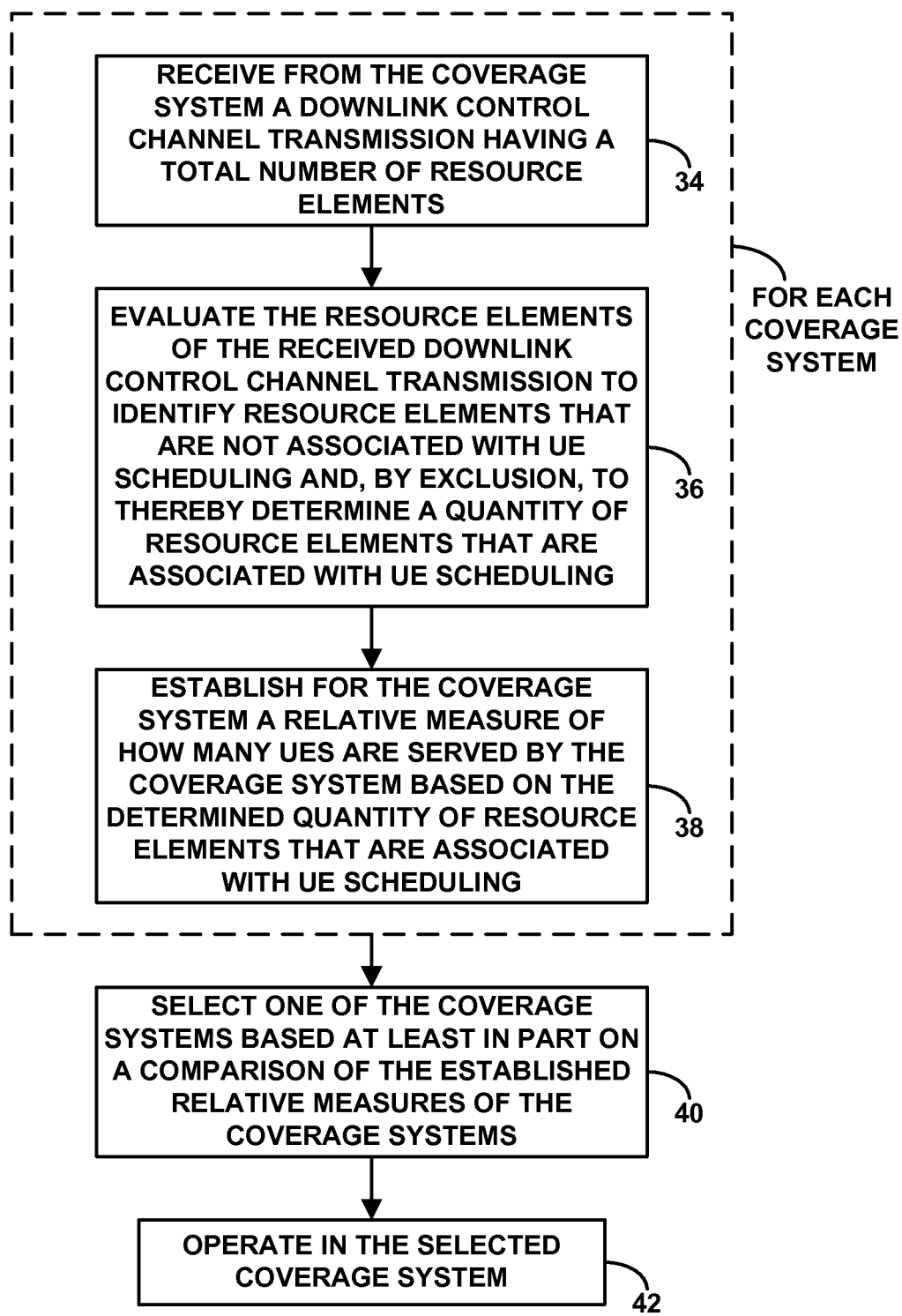
FIG. 3 is another flow chart depicting functions that can be carried out in accordance with an example implementation.
Figure 4:
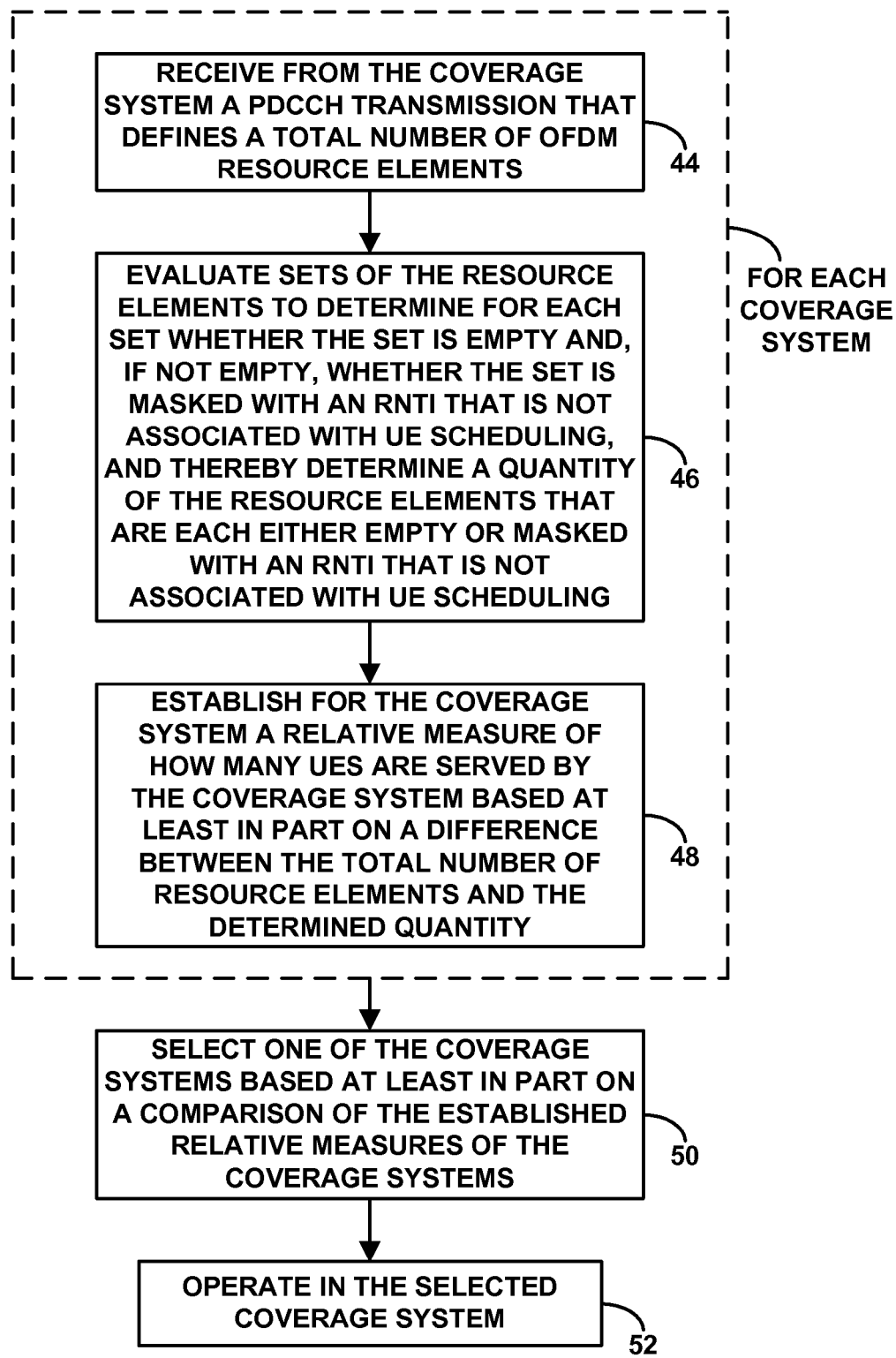
FIG. 4 is another flow chart depicting functions that can be carried out in accordance with an example implementation.

FIGS. 2, 3, and 4 are next flow charts depicting these functions in various ways.

Referring to FIG. 2, the UE carries out functions at blocks 24, 26, and 28 for each of various coverage systems detected by the UE. At block 24, the UE receives from the coverage system a downlink control channel transmission having a total number of resource elements. At block 26, the UE evaluates the resource elements of the received downlink control channel transmission to identify resource elements that are not associated with UE scheduling and to determine a quantity of the identified resource elements that are not associated with UE scheduling. And at block 28, the UE establishes for the coverage system a relative measure of how many UEs are served by the coverage system based at least on a difference between the total number and the determined quantity. At block 30 of FIG. 2, the UE then selects one of the coverage systems based at least on a comparison of the established relative measures of the coverage systems. And at block 32, the UE operates in the selected coverage system, in response to having selected the system.

In this and other processes disclosed herein, the coverage systems may be distinguished from each other at least in part by using different frequency channels, so that the act of selecting one of the coverage systems and operating in the selected coverage system may amount to selecting one of the frequency channels and operating on the selected frequency channel. Alternatively or additionally, the coverage systems may be distinguished from each other at least in part by being different coverage areas, so that selecting one of the coverage systems and operating in the selected coverage system may amount to selecting one of coverage areas and operating in the selected coverage area. Further, the act of operating in the selected coverage system may involve transmitting a request to be served by the selected coverage system.

Further, in line with the discussion above, the evaluation of each of various sets of resource elements in a received downlink control channel transmission can involve (i) making a first determination of whether the set of resource elements is empty, (ii) if the first determination is affirmative, then deeming the resource elements of the set to not be associated with UE scheduling, (iii) if the first determination is negative, then making a second determination of whether the set of resource elements is masked with any of one or more masks that are not associated with UE scheduling, (iv) if the second determination is affirmative, then deeming the resource elements of the set to not be associated with UE scheduling, and (v) if the second determination is negative, then deeming the resource elements of the set to be associated with UE scheduling.

Referring next to FIG. 3, the UE carries out functions at blocks 34, 36, and 38 for each of various coverage systems detected by the UE. At block 34, the UE receives from the coverage system a downlink control channel transmission having a total number of resource elements. At block 36, the UE evaluates the resource elements of the received downlink control channel transmission to identify resource elements that are not associated with UE scheduling and, by exclusion, to thereby determine a quantity of resource elements that are associated with UE scheduling. And at block 38, the UE establishes for the coverage system a relative measure of how many UEs are served by the coverage system based on the determined quantity of resource elements that are associated with UE scheduling. At block 40 of FIG. 3, the UE then selects one of the coverage systems based at least in part on a comparison of the established relative measures of the coverage systems. And at block 42, the UE operates in the selected coverage system, in response to having selected the system.

And referring next to FIG. 4, the UE carries out functions at blocks 44, 46, and 48 for each of various coverage systems detected by the UE. At block 44, the UE receives from the coverage system a PDCCH transmission that defines a total number of OFDM resource elements (such as those deemed relevant to this analysis, possibly excluding certain ones as discussed above). At block 46, the UE evaluates sets of the resource elements to determine for each set whether the set is empty and, if not empty, whether the set is masked with an RNTI that is not associated with UE scheduling, and the UE thereby determines a quantity of the resource elements that are each either empty or masked with an RNTI that is not associated with UE scheduling. And at block 48, the UE establishes for the coverage system a relative measure of how many UEs are served by the coverage system based at least in part on a difference between the total number of resource elements and the determined quantity. At block 50 in FIG. 4, the UE then selects one of the coverage systems based at least in part on a comparison of the established relative measures of the coverage systems. And at block 52, the UE operates in the selected coverage system, in response to having selected the system.

Figure 5:
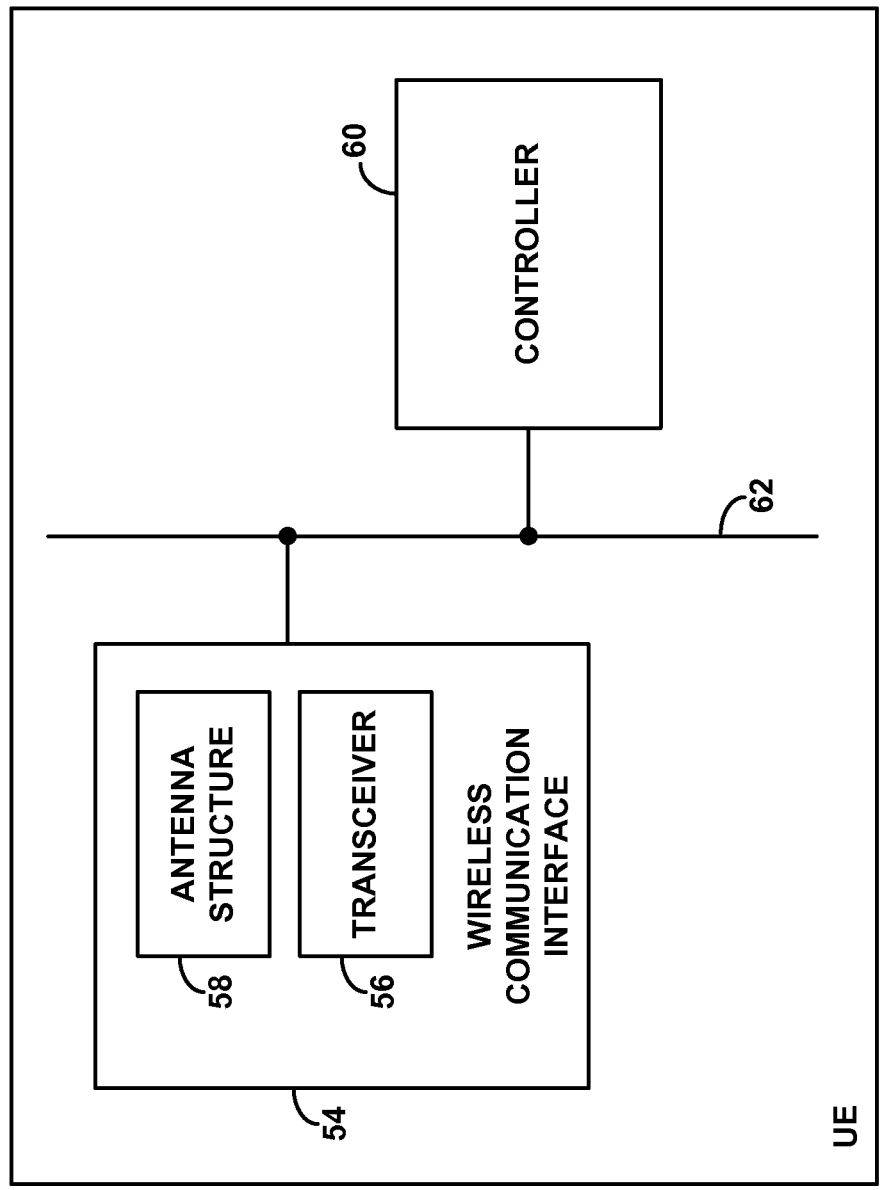
FIG. 5 is a simplified block diagram of an example UE that may operate in accordance with the present disclosure.

Finally, FIG. 5 is a simplified block diagram of an example UE, showing some of the functional components that can be included in such a device to facilitate implementation of the present disclosure in practice. The UE may be any of a variety of devices, whether or not technically operated by a "user." As shown in FIG. 5, the example UE includes a wireless communication interface 54 (shown including a representative transceiver 56 and a representative antenna structure 58) and a controller 60, all of which may be coupled together by a system bus, network, or other connection mechanism 62.

In practice, the wireless communication interface 54 may be configured for the UE to be served by an access network in accordance with an agreed air interface protocol such as LTE for instance. The controller 60 may then take various forms, including various combinations of hardware, firmware, and/or software (e.g., a processing unit programmed with machine language instructions), and may be configured to cause the UE to carry out various functions described herein.

Exemplary embodiments have been described above. Those skilled in the art will understand, however, that changes and modifications may be made to these embodiments without departing from the true scope and spirit of the invention.

We claim:

1. A method operable by a user equipment device (UE) in a wireless communication network, wherein the wireless communication network defines a plurality of coverage systems, the method comprising:

respectively for each of the coverage systems, establishing by the UE a relative measure of how many UEs are served by the coverage system, wherein establishing the relative measure comprises (a) receiving from the coverage system a downlink control channel transmission having a total number of resource elements, (b) evaluating the resource elements of the received downlink control channel transmission to identify resource elements that are not associated with UE scheduling and to determine a quantity of the identified resource elements that are not associated with UE scheduling, and (c) establishing the relative measure based at least on a difference between the total number and the determined quantity;

selecting by the UE one of the coverage systems based at least on a comparison of the established relative measures of the coverage systems; and operating by the UE in the selected coverage system.

2. The method of claim 1, wherein the coverage systems are distinguished from each other at least in part by using different frequency channels, so that selecting one of the coverage systems and operating in the selected coverage system amounts to selecting one of the frequency channels and operating on the selected frequency channel.

3. The method of claim 1, wherein the coverage systems are distinguished from each other at least in part by being different coverage areas, so that selecting one of the coverage systems and operating in the selected coverage system amounts to selecting one of coverage areas and operating in the selected coverage area.

4. The method of claim 1, wherein the downlink control channel transmission received respectively from each coverage system is a time segment of downlink control channel transmission, selected from the group consisting of a frame and a subframe.

5. The method of claim 1, wherein operating in the selected coverage system comprises transmitting a request to be served by the selected coverage system.

6. The method of claim 1, wherein the resource elements are orthogonal frequency division multiplex (OFDM) resource elements.

7. The method of claim 1, wherein evaluating the resource elements to identify resource elements that are not associated with UE scheduling comprises evaluating the resource elements to identify resource elements that are masked with any of one or more radio network temporary identifiers (RNTIs) that are not associated with UE scheduling, the one or more RNTIs including an SI-RNTI, a P-RNTI, and an RA-RNTI.

8. The method of claim 1, wherein the resource elements in the received downlink control channel transmission define a plurality of mutually exclusive sets of resource elements, wherein evaluating the resource elements to identify resource elements that are not associated with UE scheduling comprises, for each of the sets of resource elements:

making a first determination of whether the set of resource elements is empty;

if the first determination is affirmative, then deeming the resource elements of the set to not be associated with UE scheduling;

if the first determination is negative, then making a second determination of whether the set of resource elements is masked with any of one or more masks that are not associated with UE scheduling;

if the second determination is affirmative, then deeming the resource elements of the set to not be associated with UE scheduling; and if the second determination is negative, then deeming the resource elements of the set to be associated with UE scheduling.

9. The method of claim 8, wherein making the first determination of whether the set of resource elements is empty comprises determining whether the set of resource elements has a threshold low energy level.

10. The method of claim 8, wherein making the second determination of whether the set of resource elements is masked with any of one or more masks that are not associated with UE scheduling comprises reading a masked cyclic redundancy check (CRC) from the set of resource elements and determining whether any of the one or more masks, when applied to demask the masked CRC, uncovers a correct CRC for the set of resource elements.

11. A method operable by a user equipment device (UE) in a wireless communication network, wherein the wireless communication network defines a plurality of coverage systems, the method comprising:

respectively for each of the coverage systems, establishing by the UE a relative measure of how many UEs are served by the coverage system, wherein establishing the relative measure comprises (a) receiving from the coverage system a downlink control channel transmission having a total number of resource elements, (b) evaluating the resource elements of the received downlink control channel transmission to identify resource elements that are not associated with UE scheduling and, by exclusion, to thereby determine a quantity of resource elements that are associated with UE scheduling, and (c) establishing the relative measure based on the determined quantity of resource elements that are associated with UE scheduling;

selecting by the UE one of the coverage systems based at least in part on a comparison of the established relative measures of the coverage systems; and operating by the UE in the selected coverage system.

12. The method of claim 11, wherein the coverage systems are distinguished from each other by at least one characteristic selected from the group consisting of (i) using different frequency channels and (ii) being different coverage areas.

13. The method of claim 11, wherein the downlink control channel transmission received respectively from each coverage system is a time segment of downlink control channel transmission, selected from the group consisting of a frame and a subframe.

14. The method of claim 11, wherein the resource elements are orthogonal frequency division multiplex (OFDM) resource elements.

15. The method of claim 11, wherein the resource elements in the received downlink control channel transmission define a plurality of mutually exclusive sets of resource elements, wherein evaluating the resource elements of the received downlink control channel transmission to identify resource elements that are not associated with UE scheduling and, by exclusion, to thereby determine a quantity of the resource elements that are associated with UE scheduling comprises, for each of the sets of resource elements:

making a first determination of whether the set of resource elements is empty;

if the first determination is affirmative, then deeming the resource elements of the set to not be associated with UE scheduling;

if the first determination is negative, then making a second determination of whether the set of resource elements is masked with any of one or more masks that are not associated with UE scheduling;

if the second determination is affirmative, then deeming the resource elements of the set to not be associated with UE scheduling; and if the second determination is negative, then deeming the resource elements of the set to be associated with UE scheduling.

16. The method of claim 15, wherein making the first determination of whether the set of resource elements is empty comprises determining whether the set of resource elements has a threshold low energy level.

17. The method of claim 15, wherein making the second determination of whether the set of resource elements is masked with any of one or more masks that are not associated with UE scheduling comprises reading a masked cyclic redundancy check (CRC) from the set of resource elements and determining whether any of the one or more masks that are not associated with UE scheduling, when applied to demask the masked CRC, uncovers a correct CRC for the set of resource elements.

18. A method operable by a user equipment device (UE) in a wireless communication network, wherein the wireless communication network defines a plurality of coverage systems, the method comprising:
   respectively for each of the coverage systems, establishing by the UE a relative measure of how many UEs are served by the coverage system, wherein establishing the relative measure of how many UEs are served by the coverage system comprises (a) receiving from the coverage system a physical downlink control channel (PDCCH) transmission, wherein the PDCCH transmission defines a total number of orthogonal frequency division multiplex (OFDM) resource elements, (b) evaluating sets of the resource elements to determine for each set whether the set is empty and, if not empty, whether the set is masked with a radio network temporary identifier (RNTI) that is not associated with UE scheduling, and thereby determining a quantity of the resource elements that are each either empty or masked with an RNTI that is not associated with UE scheduling, and (c) establishing the relative measure based at least in part on a difference between the total number of resource elements and the determined quantity;
   selecting by the UE one of the coverage systems based at least in part on a comparison of the established relative measures of the coverage systems; and
   operating by the UE in the selected coverage system.

19. The method of claim 18, wherein the coverage systems are distinguished from each other by at least one characteristic selected from the group consisting of (i) using different frequency channels and (ii) being different coverage areas.

20. The method of claim 18, wherein determining whether the set is masked with an RNTI that is not associated with UE scheduling comprises determining whether a cyclic redundancy check (CRC) of the set is masked with an RNTI selected from the group consisting of an SI-RNTI, a P-RNTI, and an RA-RNTI.

* * * * *